Aug. 11, 1925.
A. STUBER
1,549,692
LIQUID MEASURING APPARATUS
Filed Feb. 2, 1922    4 Sheets-Sheet 1
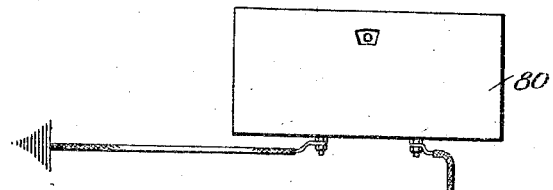
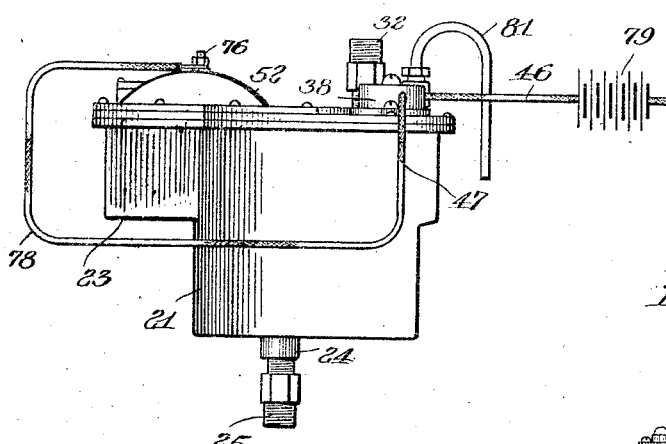
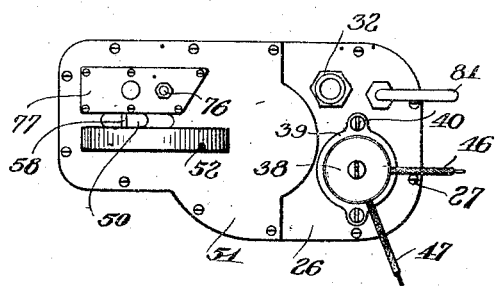
INVENTOR.
Adolph Stuber
BY
his ATTORNEY

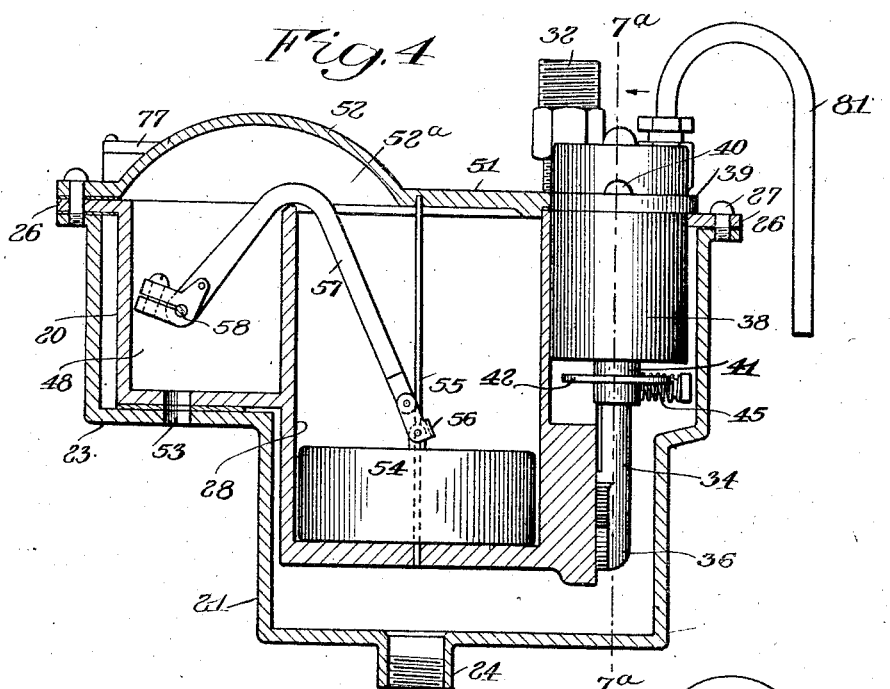
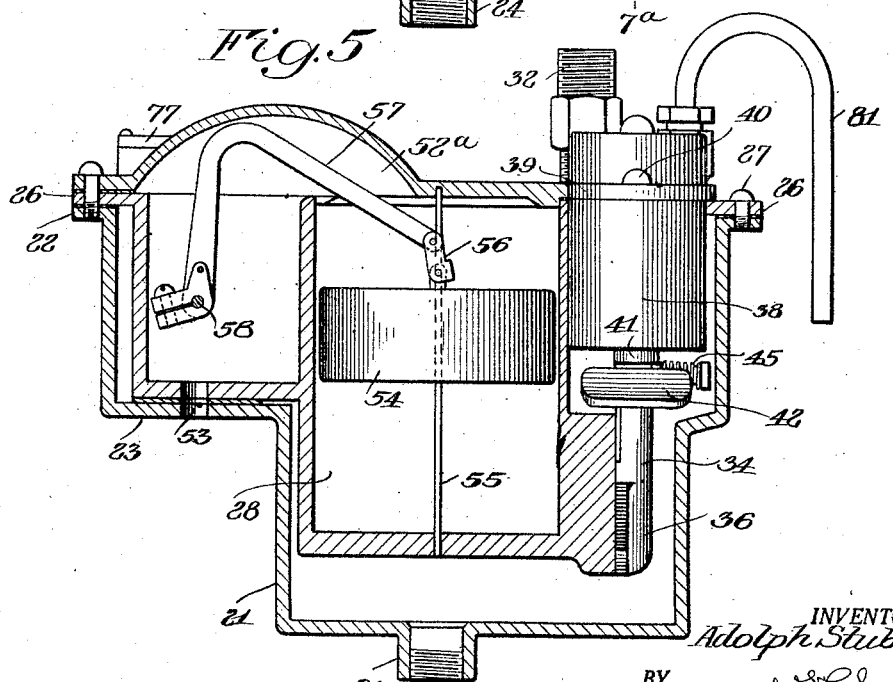

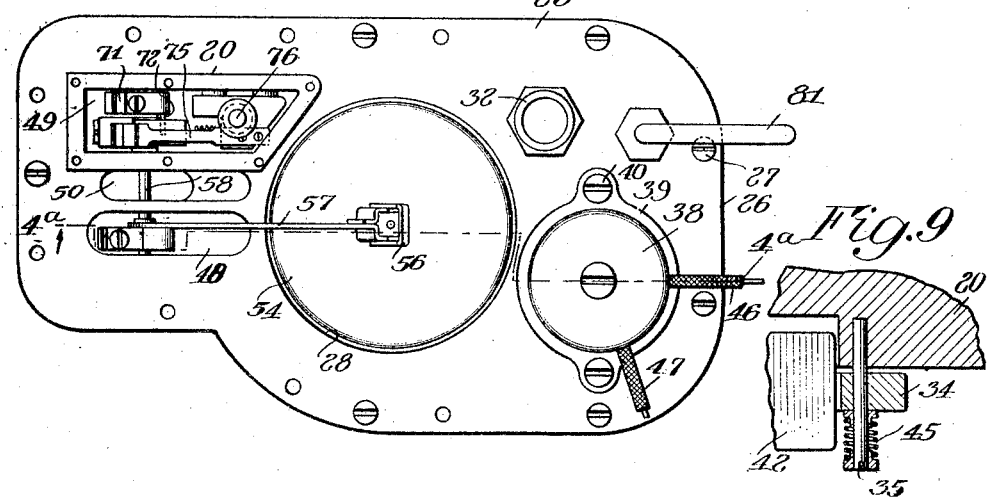

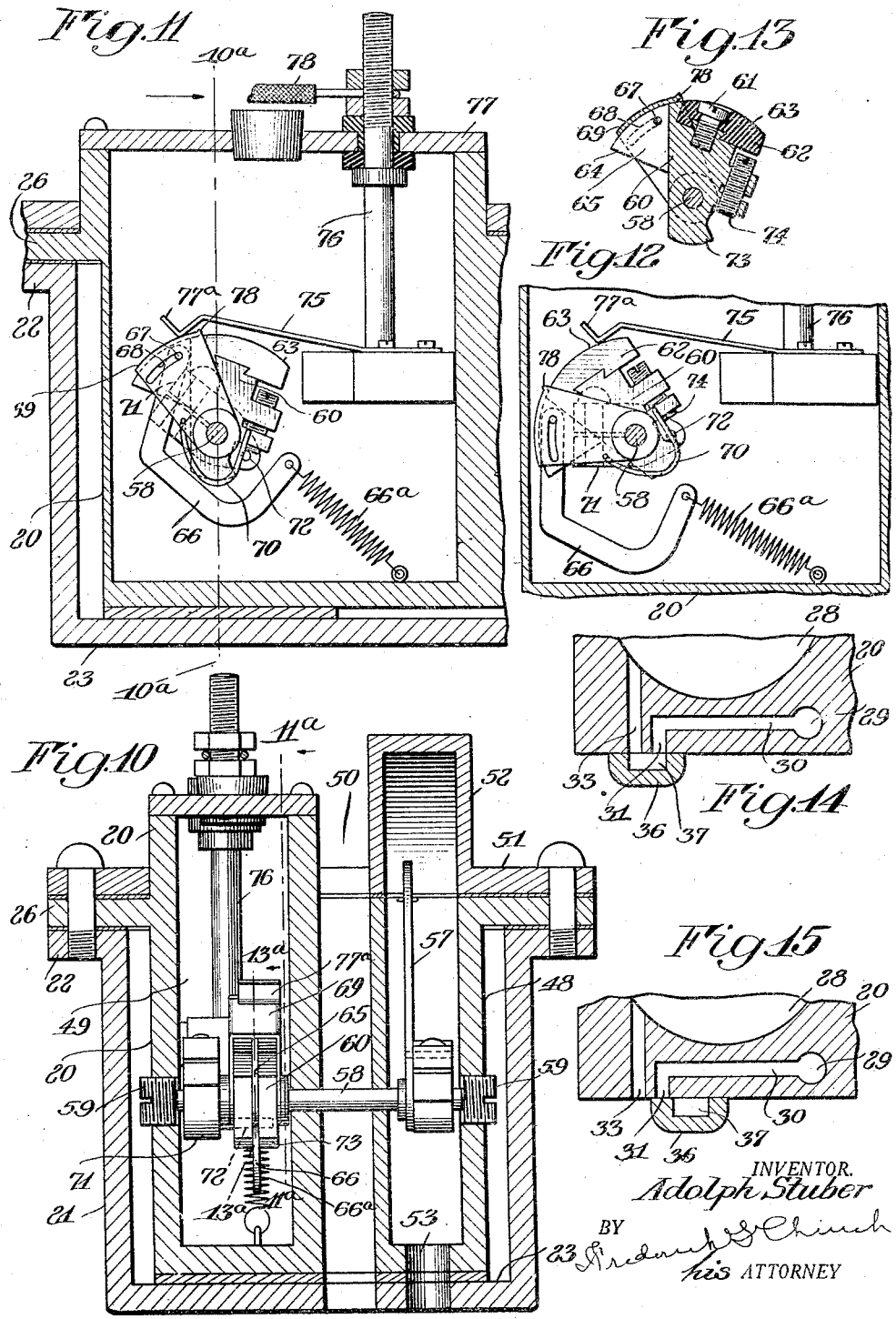

Patented Aug. 11, 1925.

1,549,692

UNITED STATES PATENT OFFICE.

ADOLPH STUBER, OF ROCHESTER, NEW YORK.

LIQUID-MEASURING APPARATUS.

Application filed February 2, 1922. Serial No. 533,509.

*To all whom it may concern:*

Be it known that I, ADOLPH STUBER, of Rochester, in the county of Monroe and State of New York, have invented certain new and useful Improvements in Liquid-Measuring Apparatus; and I do hereby declare the following to be a full, clear, and exact description of the same, reference being had to the accompanying drawings, forming a part of this specification, and to the reference numerals marked thereon.

This invention relates to liquid measuring apparatus and more particularly to the variety employing float operated electrical means for controlling the flow of liquid to and from a measuring chamber, one object of the invention being to provide a simple and practical apparatus of this character for feeding successive measured quantities of liquid, which is accurate and reliable in operation, and economical to manufacture.

Another object is to supply an apparatus of this type particularly adapted for use in the fuel feeding system of an internal combustion motor, in conjunction with a register operated electrically by the measuring apparatus, with suitable provision against the danger of ignition of the combustible fuel by possible sparking of the electrical means. To these and other ends the invention resides in certain improvements and combinations of parts all as will hereinafter be more fully described, the novel features being pointed out in the claims at the end of the specification.

In the drawings:

Figure 1 is a side elevation of a measuring apparatus embodying the present invention and shown connected in circuit with a registering mechanism;

Figure 2 is a top plan view of the measuring apparatus;

Figure 3 is an end elevation of the same;

Figures 4 and 5 are sectional elevations on the line 4ª—4ª of Figure 6, showing the parts in different operating positions.

Figure 6 is an enlarged top plan view of the apparatus with a cover portion removed.

Figures 7 and 8 are sectional elevations on the line 7ª—7ª of Figure 4;

Figure 9 is a detailed sectional view on the line 9ª—9ª of Figure 8;

Figure 10 is a sectional elevation on the line 10ª—10ª of Figure 11;

Figure 11 is a sectional elevation on the line 11ª—11ª of Figure 10;

Figure 12 is a view similar to Figure 11, but partly broken away and showing the parts in a different operating position;

Figure 13 is a detailed sectional view on the line 13ª—13ª of Figure 10; and

Figures 14 and 15 are detailed sectional views on the line 14ª—14ª of Figure 8 showing the valve means in different operating positions.

Similar reference numerals throughout the several views indicate the same parts.

The invention comprises an apparatus adapted for inclosure in a liquid supply line, for feeding successive measured quantities or units of liquid, for any of the various purposes for which such apparatus has been found useful, and the liquid may be supplied to the apparatus by gravity or pressure induced flow. The embodiment disclosed by way of illustration in the present instance is particularly suitable for inclusion in the fuel feeding system of an internal combustion motor, by reason of the facts, among others, that its electrical operating means may be included in circuit with a counter or register, such, for example, as that disclosed in my prior Patent No. 1,355,183 of October 12, 1920, for fluid measuring and indicating mechanism, and also that provision is made against the danger of ignition of the combustible gas by possible sparking of the electrical means. Its simplicity of construction, reliability in operation and comparative small size also adapt the apparatus for use on a motor vehicle where considerable vibration and limits of available space require consideration.

Referring more particularly to the drawings, the apparatus is shown as comprising preferably a pair of nested, inner and outer receptacles, 20 and 21, respectively, which are readily formed as metal castings. The outer receptacle 21 is preferably of the shape shown, having an open top the wall rim about which is provided with an outwardly extending flange 22. The receptacle is of reduced depth at one end the bottom 23 of which provides a supporting surface for a portion of the inner receptacle, as presently to be described, and the lower portion or bottom of the other end of the outer receptacle is provided with an outlet opening 24 adapted for the attachment of a discharge conduit, or pipe 25.

The inner receptacle is divided by partitions into several sections and has at its top a plate or flange 26 resting on the flange of the outer receptacle and secured thereto as by means of screws 27, so that the inner receptacle closes the top of the outer. Inner receptacle 20 comprises a cylindrical chamber 28 in which actuating float means is located and which serves as the measuring chamber. The right hand end of the inner receptacle, as seen for example in Figure 4, has a somewhat thickened wall in which is formed a vertical passageway 29 opening through the top flange 26 of the receptacle and extended laterally at its bottom as at 30 with the end of the lateral extension opening outwardly through the wall of the receptacle to form a port opening 31. This is the supply passageway or conduit with the upper end of which is connected a supply pipe 32 leading to a liquid tank or other source of supply. In the wall of the receptacle adjacent the supply port 31 is formed a discharge port or outlet 33 communicating by a passageway with the measuring chamber 28, and suitable valve means are provided for alternately opening and closing the ports to control the flow of liquid to and from the measuring chamber.

The valve means comprises preferably an irregular shaped member or lever 34, Figure 7, pivoted at 35 on the outer end wall of the inner receptacle. During pivotal movement of the member its lower end 36 slides over the plane surface of the receptacle in which the ports 31 and 33 are formed, being itself recessed as at 37 to serve as a valve slide. It is apparent from this construction that as valve 36 is moved to the position shown in Figure 14, the supply conduit or port is connected with the port 33 for feeding liquid to the measuring chamber. As valve 36, however, is moved to the position shown in Figure 15, port 33 is uncovered for the discharge of liquid from the measuring chamber into the outer receptacle, while the supply port 31 is closed to stop the feed of liquid. The valve thus controls the flow of liquid to alternately fill and empty the measuring chamber.

The means for actuating the valve comprises preferably a solenoid 38 arranged to extend downwardly above the valve through an opening in a cover plate 26 of the inner receptacle, the solenoid having preferably a flange 39 secured as by means of screws 40 to the cover plate. Cooperating with the core portion 41 at the lower end of the solenoid is an armature 42 carried by the valve member 34 for moving the valve to one position, Figure 7, while a spring 43 secured to the valve member and to the receptacle wall serves to move the valve to its other position when released by the solenoid, as shown in Figure 8. The movement of the valve is limited to position the same in one direction by engagement of its armature with the core of the solenoid and in the other direction by engagement of a stop arm 44 on the valve member with the side of the solenoid. The pin 35, Figure 9, on which the valve member is pivotally supported is provided with a spring 45, as shown, for holding the valve 36 in close engagement with the surface in which the valve ports are formed. The movable valve parts as well as the larger portion of the solenoid are thus compactly arranged and housed and protected within the outer receptacle, the upper end only of the solenoid being exposed from which end project the circuit leads 46 and 47 for inclusion in a circuit governed by float actuated electrical contacts presently to be described.

The inner receptacle comprises, in addition to the liquid measuring float chamber, two lateral compartments 48 and 49 of less depth than the measuring chamber and having their bottoms resting on the supporting surface 23 at one end of the outer receptacle. These compartments are separated by an external air space 50 formed by a passage which extends through the bottom portions of both receptacles and through the cover of the inner receptacle to provide for free access and passage of the external air between compartments 48 and 49 for a purpose presently to be described.

The receptacle 20 has secured over its cover plate 26 an auxiliary cover plate 51 closing the measuring chamber and compartment 48 but having an opening receiving the upper end of compartment 49 which as shown in Figure 10 extends upwardly some distance above the receptacle. Auxiliary cover plate 51 has an elevated portion 52 providing for communication between the measuring chamber and compartment 48. The latter serves as an overflow compartment having the overflow channel 52ᵃ with the measuring chamber described and provided at its bottom with a drainage opening 53 extending also through the bottom portion 22 of the outer receptacle. Should the measuring chamber overflow for any reason the excess liquid passing into overflow compartment 48 is at once drained out of the latter so that it is maintained free of liquid.

The float means for actuating the switch contacts controlling the solenoid and valve comprises, preferably, a cylindrical buoyant float body 54 rising and falling with the liquid in measuring chamber 28, which latter is provided with a guide rod 55 to maintain the float clear of the walls of the chamber and reduce frictional restraint of its movement. The upper side of the float has pivotally connected therewith a link 56 pivotally connected also with one end of an angular arm 57 extending through the overflow channel into overflow compartment 48 where its end is fixed in any suitable manner to a rock shaft 58. The latter extends across air space 50 between compartments 48 and 49, through the adjacent walls of the compartments, and into the latter at its respective ends which are journalled in bearings in set screws 59 in the outer walls of the compartments. Shaft 58 is thus rotatably supported and as the float means rises and falls with the liquid in the measuring chamber the shaft is rocked by the connecting means described for actuating the switch contacts in compartment 49. It is to be noted that the rock shaft is closely engaged by the bearing portions in the adjacent walls of the two compartments to prevent any transmission of combustible liquid or gas along the shaft into the switch compartment 49, and this arrangement, in addition to the fact that compartment 48 is maintained free from liquid, and that the shaft passes through the exterior air space 50 between the compartments, effectively prevents any liquid or gas reaching the switch contacts. This structure thus eliminates the possibility of ignition of gas by possible sparking at the contacts.

The electrical switch actuated by rock shaft 58 for controlling the operation of solenoid 38, and the valve, comprises preferably a snap or quick acting construction which reduces sparking to a minimum. This construction includes an irregularly shaped member 60, Figures 10 to 13 inclusive, pivotally supported on shaft 58 within compartment 49. The upper portion of member 60 has secured thereto, as by means of a screw 61, a member 62 of insulating material having a contact surface 63 concentric with the shaft. Member 60 has a triangularly shaped extension 64 which is slotted as at 65 to receive the upper end of an angular link 66 actuated by a tension spring 66ª. The angular link is pivotally connected at its upper end with a pin 67 carried by the extension 64 across the slot 65 therein. Pin 67 extends at its ends beyond the opposite sides of extension 64 where its ends ride in slots 68 in a bail shaped member 69 the arms of which are pivotally supported on shaft 58 on opposite side of member 60. A spring 70 fixed to member 60 and bail 69 tends to move the bail to carry its outer end away from the insulating portion 63 of member 60. Fixed on shaft 58 at one side of member 60 is a yoke 71 carrying a pin 72 extending between a tail portion 73 of member 60 and an adjustable set screw 74 thereon for moving member 60 in opposite directions when the shaft is rocked.

Bail member 69 is of electrically conducting material and forms one of the switch contacts, being electrically connected with shaft 58 and the material of the receptacles which is preferably grounded on the frame supporting the apparatus. The other switch contact is preferably in the form of a conducting leaf spring 75 fixed on the lower end of a binding post 76 carried by and insulated from a cover plate 77 closing the upper end of a compartment 49. Contact 75 has an angular end 77ª, as shown, adapted to rest on the end of the bail shaped contact 69 which latter preferably has an upturned lip 78 from which contact 75 is adapted to drop quickly when the bail is moved away from it. It is evident from this construction that as shaft 58 is rocked by the float means from the position shown in Figure 11 in which the contacts 69 and 77ª are engaged to the position shown in Figure 12 in which they are disengaged, the pin 72 carried by the shaft engages set screws 74 of member 60, rocking the latter and with it the movable switch contact 69. As the upturned lip 78 of the latter engages contact 77ª it is temporarily restrained as member 60 continues to move, until pin 67 of the latter passes the dead center relative to link 66. When this occurs the spring actuated link snaps member 60 to its other extreme position shown in Figure 12, and as member 60 becomes accelerated in this movement its pin 67, engaging the end of slot 68 of the movable contact, quickly snaps the latter away from the stationary contact 77ª and breaks the circuit. Spring 70 then moves contact 69 to the position shown in Figure 12 ready for a return movement. As the shaft rocks in the other direction past the dead center of link 66 the contacts are again brought quickly together by the snap action of member 60 and the bail contact. Binding post 76 of the stationary contact is connected by means of a conductor 78 with lead 47 of the solenoid. The other lead 46 of the latter is connected with a suitable source of power indicated at 79, which in the present application of the apparatus, is connected with a registering mechanism indicated at 80 of the variety, for example, disclosed in my said Letters Patent. The circuit then passes to the ground which in the present application may be formed by the frame of the automobile with which the measuring apparatus is also connected, thus completing the circuit. A conduit 81 is preferably provided to maintain atmospheric pressure in the outer receptacle, the inner receptacle being connected with the atmosphere through the drainage opening 53.

In operation, assuming that the measuring chamber has been filled with liquid and its discharge port 33 uncovered by the valve, the liquid flows into the outer receptacle and through its outlet 24 to the carburetor. As the float falls with the liquid level and reaches its lower position, it rocks shaft 58, engaging switch contacts 69 and 77ª, thus completing the circuit through the solenoid 38. The energization of the latter shifts valve 36 as described to the position of Figure 14, connecting the port 33 of the measuring chamber with port 31 of the supply passage. The valve is maintained in this position by the solenoid while the measuring chamber fills and until the float is raised to its upper position and rocks the shaft to disengage the switch contacts. The breaking of the circuit deenergizes the solenoid and allows spring 43 to shift the valve to its opposite position, closing the supply passageway and opening the outlet port of the measuring chamber. Adjustment of set screws 74 of the switch regulates accurately the quantity or unit of liquid discharged at each operation of the float and the latter and other moving parts are so constructed and guided in their movements as to insure accurate and reliable operation. The rapid action of the switch not only contributes to accuracy in results but also tends effectively to prevent sparking in the closed compartment 49. The arrangement of the parts as already described in detail eliminates possibility of combustible gas reaching the switch contacts. The valve means has but a small movement which efficiently controls the flow of the liquid. The apparatus is thus adapted to measure and feed liquid of a combustible nature or otherwise in accurately measured units and when employed in conjunction with a registering mechanism such as disclosed in my said Letters Patent, serves as an efficient metering means for the liquid for indicating in conjunction with the register the amount of fuel consumed.

I claim as my invention:

1. A liquid measuring and feeding apparatus comprising a receptacle having supply and outlet passages and an overflow compartment provided with a drainage opening, valve means controlling said supply and outlet passages, electrical means for operating said valve means including switch contacts located exteriorly of said receptacle, float means in the receptacle, and an actuating connection passing from said float means through said compartment and exteriorly of the receptacle for actuating said switch contacts.

2. A liquid measuring and feeding apparatus comprising a receptacle having supply and outlet passages, an overflow compartment for said receptacle provided with a drainage opening, a closed compartment separated from said overflow compartment by a space exterior of the receptacle, valve means controlling said supply and outlet passages, electrical means for operating said valve means including switch contacts located in said closed compartment, float means in the receptacle, and an actuating connection passing from said float means through said overflow compartment and space and into said closed compartment for actuating said switch contacts.

3. A liquid measuring and feeding apparatus comprising a receptacle having supply and outlet passages, an overflow compartment for said receptacle provided with a drainage opening, a closed compartment separated from said overflow compartment by a space exterior of the receptacle, valve means controlling said supply and outlet passages, electrical means for operating said valve means including switch contacts located in said closed compartment, a rotary shaft extending across said exterior space into each of said compartments and connected with said switch contacts, and float means in the receptacle connected with said shaft in said overflow compartment for actuating the same and said switch contacts.

4. A liquid measuring and feeding apparatus comprising a receptacle having supply and outlet passages and an overflow compartment provided with a drainage opening, a single valve member controlling said supply and outlet passages, electrical means for operating said valve member including switch contacts located exteriorly of said receptacle, float means in the receptacle, and an actuating connection passing from said float means through said overflow compartment and exteriorly of the receptacle for actuating said switch contacts.

5. A liquid measuring and feeding apparatus comprising a receptacle having supply and outlet passages communicating therewith adjacent each other, an overflow compartment for said receptacle having a drainage opening, a closed compartment separated from said overflow compartment by an exterior air space, a valve member controlling said supply and outlet passages, electrical means for operating said valve member including a snap switch located in said closed compartment, a rock shaft extending through said air space into each compartment and connected with said switch, and a float in the receptacle connected with the shaft in said overflow compartment for actuating the same and said switch contacts.

6. A liquid measuring and feeding apparatus comprising a pair of receptacles having a port therebetween, a supply conduit leading to one of said receptacles and an outlet leading from the other, valve means controlling said port and conduit, a closed compartment in one of said receptacles, electrical means in said compartment for actuating said valve means, float means in the receptacle having said supply conduit, and an actuating connection for said electrical means passing from said float means exteriorly of said receptacles into said compartment.

7. In a liquid measuring and feeding apparatus, the combination of a receptacle comprising a measuring chamber having supply and outlet passages, a closed compartment and an overflow compartment having a drainage outlet and an overflow channel leading from said chamber thereto, said compartments having an exteriorly arranged air space therebetween, valve means for alternately opening and closing said passages, a solenoid carried exteriorly by said receptacle for operating said valve means, a rock shaft extending through said air space into said compartments, an electric switch in said closed compartment actuated by said shaft, a circuit including said switch, solenoid and a source of power, a float in said chamber, an arm connected with said float and extending through said overflow channel and fixed to said shaft, and a casing inclosing said receptacle and operating parts and provided with a fluid discharge opening.

8. In a liquid measuring and feeding apparatus, the combination of an outer receptacle having an open top and fluid discharge means, an inner receptacle having a flange supported on the rim of the outer receptacle to close the same and comprising a fluid measuring chamber provided with a supply passage and with an outlet passage leading to said outer receptacle, a closed compartment, and an overflow compartment having a drainage opening and an overflow connection with said chamber, said compartments being separated by an exterior air space, valve means controlling said supply and outlet passages, electrical means for operating said valve means including a switch in said closed compartment, a rock shaft extending across said air space into each compartment for actuating said switch, a float in said chamber, and an arm fixed on said shaft in said overflow compartment and connected with said float.

ADOLPH STUBER.